United States Patent
Higashi et al.

(10) Patent No.: US 10,043,044 B2
(45) Date of Patent: Aug. 7, 2018

(54) CARD READER

(71) Applicant: NIDEC SANKYO CORPORATION, Suwa-gun, Nagano (JP)

(72) Inventors: Katsuhisa Higashi, Nagano (JP); Ikuro Kuribayashi, Nagano (JP); Hirotaka Sakamaki, Nagano (JP); Tomomi Takeda, Nagano (JP); Keiji Hoson, Nagano (JP); Mamoru Mizawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 72 days.

(21) Appl. No.: 15/120,188

(22) PCT Filed: Feb. 10, 2015

(86) PCT No.: PCT/JP2015/053614
§ 371 (c)(1),
(2) Date: Aug. 19, 2016

(87) PCT Pub. No.: WO2015/125664
PCT Pub. Date: Aug. 27, 2015

(65) Prior Publication Data
US 2017/0249485 A1   Aug. 31, 2017

(30) Foreign Application Priority Data

Feb. 21, 2014   (JP) .................. 2014-031896

(51) Int. Cl.
*G06K 7/08*   (2006.01)

(52) U.S. Cl.
CPC .................. *G06K 7/087* (2013.01)

(58) Field of Classification Search
CPC ... G07F 19/2055; G07F 7/0873; G06K 7/087; G06K 7/082; G06K 13/067
See application file for complete search history.

(56) References Cited

U.S. PATENT DOCUMENTS

2011/0135092 A1   6/2011   Lehner et al.

FOREIGN PATENT DOCUMENTS

| JP | 2005266999 A | 9/2005 |
| JP | 2007164533 A | 6/2007 |
| WO | 2011093340 A1 | 8/2011 |
| WO | 2012073691 A1 | 6/2012 |

OTHER PUBLICATIONS

International Search Report corresponding to Application No. PCT/JP2015/053614; dated Apr. 28, 2015, with English translation.

*Primary Examiner* — Sonji Johnson
(74) *Attorney, Agent, or Firm* — Cantor Colburn LLP

(57) ABSTRACT

A card reader may include a card insertion port; a card passage; and a disturbing magnetic field generator. The disturbing magnetic field generator may include a first disturbing magnetic field generation part and a second disturbing magnetic field generation part which are disposed so as to interpose the card passage. The first disturbing magnetic field generation part may include a first core formed of magnetic material and a coil wound around the first core, and the second disturbing magnetic field generation part may include a second core formed of magnetic material and a coil wound around the second core.

14 Claims, 5 Drawing Sheets

CARD READER

CROSS REFERENCE TO RELATED APPLICATIONS

This is the U.S. national stage of application No. PCT/JP2015/053614, filed on Feb. 10, 2015. Priority under 35 U.S.C. § 119(a) and 35 U.S.C. § 365(b) is claimed from Japanese Application No. 2014-031896, filed Feb. 21, 2014, the disclosure of which is incorporated herein by reference.

TECHNICAL FIELD

At least an embodiment of the present invention relates to a card reader structured to perform reading of magnetic data recorded on a card and recording magnetic data to a card.

BACKGROUND

Conventionally, a card reader has been widely utilized which is structured to read data recorded on a card and record data to a card. In an industry such as a financial institution where a card reader is utilized, illegal acquisition of magnetic data of a card by a criminal who attaches a magnetic head to a card insertion part of a card reader, in other words, so-called skimming, has conventionally become a large issue. In order to cope with the issue, a card reader has been proposed which includes a disturbing magnetic field generation part for preventing reading of magnetic data by a magnetic head for skimming (hereinafter, referred to as a "skimming magnetic head") (see, for example, Patent Literature 1).

In the card reader described in Patent Literature 1, the disturbing magnetic field generation part includes, as shown in FIG. 6, two radiation sources 101 and 102 configured to radiate a disturbing magnetic field. The radiation sources 101 and 102 are disposed so as to interpose a conveying passage 104 for a card 103 therebetween in an upper and lower direction. Further, each of the radiation sources 101 and 102 is provided with a core 105 formed of magnetic material and a coil 106 wound around the core 105. The core 105 is formed in a substantially bottomed cylindrical tube shape as a whole and is provided with a winding core 105a in a columnar shape which is stood up from its bottom part toward an opening side of a cylindrical tube part. The coil 106 is wound around the winding core 105a. The radiation sources 101 and 102 are, as shown in FIG. 6, disposed so that, when viewed in a width direction of a card 103, imaginary lines "L101" and "L101" perpendicular to respective end faces of the winding cores 105a are inclined with respect to a passing direction of the card 103 and intersect each other to a front side of an insertion port 107 for the card 103. Further, the radiation sources 101 and 102 are disposed so that the imaginary lines "L101" and "L101" intersect each other in a thickness direction of the card 103 at a position where the card 103 is passed.

As shown in FIG. 7, a magnetic head commonly includes a core 111 formed of magnetic material, a coil 112 wound around the core 111, terminals 113 with which both end parts of the coil 112 are connected, and a case body 114 in which the core 111, the coil 112 and the terminals 113 are accommodated. The case body 114 is formed of magnetic material. A magnetic gap 111a is formed in the core 111 at one end (tip end) of the magnetic head and the coil 112 is wound around the core 111 on the other end side (base end side) of the magnetic head. Further, an opening part 114a for exposing the magnetic gap 111a is formed in the case body 114 on the tip end side of the magnetic head. On the other hand, the case body 114 is opened on the base end side of the magnetic head.

A skimming magnetic head is similarly structured to the magnetic head shown in FIG. 7 and, as shown in FIG. 6, the skimming magnetic head 110 is arranged so that its magnetic gap is capable of contacting with a magnetic stripe of a card 103. In other words, the skimming magnetic head 110 is arranged so that the tip end side of the skimming magnetic head 110 is disposed on a card 103 side. As described above, in the card reader described in Patent Literature 1, when viewed in a width direction of a card 103, the radiation sources 101 and 102 are disposed so that the imaginary lines "L101" and "L101" intersect each other on a front side with respect to the insertion port 107 for a card 103 and, in a thickness direction of the card 103, at a position where the card 103 is passed. Therefore, in the card reader, influence of a disturbing magnetic field can be effectively applied to the magnetic gap of the skimming magnetic head 110.

PATENT LITERATURE

[PTL 1] Japanese Patent Laid-Open No. 2007-164533

In order to prevent reading of magnetic data by a skimming magnetic head, it is preferable to effectively apply influence of a disturbing magnetic field to the skimming magnetic head. Therefore, in view of the problem described above, at least an embodiment of the present invention provides a card reader which is capable of applying influence of a disturbing magnetic field to a skimming magnetic head further effectively.

SUMMARY

To achieve the above, at least an embodiment of the present invention provides a card reader including a card insertion port into which a card having a magnetic stripe is inserted, a card passage where the card inserted from the card insertion port is passed, and a disturbing magnetic field generation means structured to generate a disturbing magnetic field for disturbing fraudulent reading of magnetic data recorded in the magnetic stripe. The disturbing magnetic field generation means includes at least one disturbing magnetic field generation part pair comprised of a first disturbing magnetic field generation part and a second disturbing magnetic field generation part which are disposed so as to interpose the card passage in a thickness direction of the card. The first disturbing magnetic field generation part includes a first core formed of magnetic material and a coil wound around the first core, and the second disturbing magnetic field generation part includes a second core formed of magnetic material and a coil wound around the second core. When an inserting direction side of the card to the card insertion port which is one side in a passing direction of the card is referred to as a rear side, an ejecting direction side of the card from the card insertion port which is the other side in the passing direction of the card is referred to as a front side, an imaginary line passing through a center of a first end face which is one of end faces of the first core and perpendicular to the first end face is referred to as a first imaginary line, and an imaginary line passing through a center of a second end face which is one of end faces of the second core and perpendicular to the second end face is referred to as a second imaginary line, the first core and the second core are disposed so that, when viewed in a width direction of the card perpendicular to the passing direction of the card and a thickness direction of the card, the first imaginary line and the second imaginary line are inclined with respect to the passing direction of the card so as to approach each other toward the front side and intersect each other on the front side with respect to the card insertion port and intersect each other at a position displaced from a passing position of the card in the thickness direction of the card.

In the card reader in accordance with at least an embodiment of the present invention, the disturbing magnetic field generation means includes a disturbing magnetic field generation part pair comprised of a first disturbing magnetic field generation part and a second disturbing magnetic field generation part which are disposed so as to interpose the card passage in a thickness direction of a card. Further, the first disturbing magnetic field generation part includes a first core and a coil wound around the first core, and the second disturbing magnetic field generation part includes a second core and a coil wound around the second core. In addition, the first core and the second core are disposed so that, when viewed in a width direction of the card perpendicular to a passing direction of the card and a thickness direction of the card, a first imaginary line perpendicular to a first end face of the first core and a second imaginary line perpendicular to a second end face of the second core are inclined with respect to the passing direction of the card so as to approach each other toward a front side and intersect each other on the front side with respect to the card insertion port and at a position displaced from a passing position of the card in the thickness direction of the card.

Therefore, according to at least an embodiment of the present invention, influence of the disturbing magnetic field generated by one of the first disturbing magnetic field generation part and the second disturbing magnetic field generation part is capable of being effectively applied to a magnetic gap of a skimming magnetic head which is arranged on a front side with respect to the card insertion port. Further, according to at least an embodiment of the present invention, influence of the disturbing magnetic field generated by the other of the first disturbing magnetic field generation part and the second disturbing magnetic field generation part is capable of being effectively applied to an opening part of a case body of the skimming magnetic head. In other words, influence of the disturbing magnetic field is capable of being effectively applied to a core and a coil of the skimming magnetic head which are not covered by magnetic material through an opening part of its case body. As described above, in at least an embodiment of the present invention, influence of the disturbing magnetic field is capable of being effectively applied to a magnetic gap of a skimming magnetic head and influence of the disturbing magnetic field is capable of being effectively applied to a core and a coil of the skimming magnetic head which are not covered by magnetic material. Therefore, according to at least an embodiment of the present invention, influence of the disturbing magnetic field is capable of being further effectively applied to a skimming magnetic head.

Further, at least an embodiment of the present invention provides a card reader including a card insertion port into which a card having a magnetic stripe is inserted, a card passage where the card inserted from the card insertion port is passed, and a disturbing magnetic field generation means structured to generate a disturbing magnetic field for disturbing fraudulent reading of magnetic data recorded in the magnetic stripe. The disturbing magnetic field generation means includes a core formed of magnetic material and a coil wound around the core. When an inserting direction side of the card to the card insertion port which is one side in a passing direction of the card is referred to as a rear side, an ejecting direction side of the card from the card insertion port which is the other side in the passing direction of the card is referred to as a front side, an imaginary line passing through a center of a first end face which is one of end faces of the core and perpendicular to the first end face is referred to as a first imaginary line, and an imaginary line passing through a center of a second end face which is the other of the end faces of core and perpendicular to the second end face is referred to as a second imaginary line, the core is formed so that the first end face and the second end face are directed to a substantially front side in the passing direction of the card and, so that the first end face and the second end face are disposed so as to interpose the card passage in a thickness direction of the card. Further, when viewed in a width direction of the card perpendicular to the passing direction of the card and the thickness direction of the card, the first imaginary line and the second imaginary line are inclined with respect to the passing direction of the card so as to approach each other toward the front side and intersect each other on the front side with respect to the card insertion port and intersect each other at a position displaced from a passing position of the card in the thickness direction of the card.

In the card reader in accordance with at least an embodiment of the present invention, the disturbing magnetic field generation means includes a core and a coil wound around the core. The core is formed so that a first end face which is one end face of the core and a second end face which is the other end face of the core are directed toward a front side in a passing direction of the card and so that the first end face and the second end face are disposed so as to interpose the card passage in a thickness direction of the card. Further, the core is formed so that, when viewed in a width direction of the card, the first imaginary line and the second imaginary line are inclined with respect to the passing direction of the card so as to approach each other toward the front side and intersect each other on the front side with respect to the card insertion port and intersect each other at a position displaced from a passing position of the card in the thickness direction of the card.

Therefore, according to at least an embodiment of the present invention, influence of the disturbing magnetic field generated from one of the first end face side and the second end face side is capable of being effectively applied to a magnetic gap of a skimming magnetic head which is disposed on a front side with respect to the card insertion port. Further, according to at least an embodiment of the present invention, influence of the disturbing magnetic field generated by the other of the first end face side and the second end face side is capable of being effectively applied to an opening part of a case body of the skimming magnetic head. In other words, influence of the disturbing magnetic field is capable of being effectively applied to a core and a coil of the skimming magnetic head through an opening part of its case body which is not covered by magnetic material. As described above, according to at least an embodiment of the present invention, influence of the disturbing magnetic field is capable of being effectively applied to a magnetic gap of a skimming magnetic head and influence of the disturbing magnetic field is capable of being effectively applied to a core and a coil of the skimming magnetic head which are not covered by magnetic material. Therefore, according to at least an embodiment of the present invention, influence of the disturbing magnetic field is capable of being further effectively applied to the skimming magnetic head.

In at least an embodiment of the present invention, it is preferable that the first end face and the second end face are disposed at positions in the width direction of the card where the magnetic stripe is passed. In a width direction of the card, a skimming magnetic head is disposed at a position where a magnetic stripe is passed. Therefore, according to this structure, influence of the disturbing magnetic field is capable of being further effectively applied to the skimming magnetic head.

In at least an embodiment of the present invention, it is preferable that the card reader includes a magnetic head configured to perform at least one of reading of magnetic data recorded in the magnetic stripe and recording of magnetic data to the magnetic stripe, when one side in the thickness direction of the card is referred to as a first direction side and the other side in the thickness direction of the card is referred to as a second direction side, the magnetic head is disposed so as to face the card passage from the first direction side, the first end face is disposed on the first direction side with respect to the card passage in the thickness direction of the card, and the second end face is disposed on the second direction side with respect to the card passage in the thickness direction of the card, the first end face and the second end face are disposed at substantially same positions in the passing direction of the card, a distance in the thickness direction of the card between the first end face and the card passage and a distance in the thickness direction of the card between the second end face and the card passage are substantially equal to each other, and when viewed in the width direction of the card, an inclination angle of the first imaginary line with respect to the passing direction of the card is set to be smaller than an inclination angle of the second imaginary line with respect to the passing direction of the card. According to this structure, the first end face and the second end face are disposed at substantially same positions as each other in the passing direction of the card, and a distance in a thickness direction of the card between the first end face and the card passage and a distance in the thickness direction of the card between the second end face and the card passage are substantially equal to each other. Therefore, influence of the disturbing magnetic field is capable of being effectively applied to a magnetic gap of a skimming magnetic head and to a core and a coil of the skimming magnetic head which are not covered by magnetic material and, in addition, the size of the card reader is capable of reducing in the passing direction of the card and the thickness direction of the card.

In at least an embodiment of the present invention, it is preferable that a frequency of a disturbing magnetic field generated by the disturbing magnetic field generation means is included in a band width of a data frequency determined by recording density of magnetic data recorded in the magnetic stripe and a moving speed of the card in the card reader. According to this structure, in a read signal outputted from the skimming magnetic head, a read signal caused by magnetic data of a card is hard to be distinguished from a read signal caused by the disturbing magnetic field. Therefore, skimming is capable of being effectively prevented.

Further, in this case, it is preferable that a frequency of a disturbing magnetic field generated from the first end face side and a frequency of a disturbing magnetic field generated from the second end face side are different from each other. According to this structure, in a read signal outputted from the skimming magnetic head, a read signal caused by magnetic data of a card is further hard to be distinguished from a read signal caused by the disturbing magnetic field. Therefore, skimming is capable of being prevented further effectively.

In at least an embodiment of the present invention, it is preferable that the card reader includes a first magnetic head structured to perform at least one of reading of magnetic data recorded in the magnetic stripe formed on a rear face of the card and recording of magnetic data to the magnetic stripe, and a second magnetic head structured to perform at least one of reading of magnetic data recorded in the magnetic stripe formed on a front face of the card and recording of magnetic data to the magnetic stripe. When one side in a thickness direction of the card is referred to as a first direction side and the other side in the thickness direction of the card is referred to as a second direction side, the first magnetic head is disposed so as to face the card passage from the first direction side and the second magnetic head is disposed so as to face the card passage from the second direction side. The disturbing magnetic field generation means includes two disturbing magnetic field generation part pairs, the first core and the second core of one of the disturbing magnetic field generation part pairs are disposed so that the first imaginary line and the second imaginary line intersect each other on the first direction side with respect to the card passage in the thickness direction of the card, and the first core and the second core of the other of the disturbing magnetic field generation part pairs are disposed so that the first imaginary line and the second imaginary line intersect each other on the second direction side with respect to the card passage in the thickness direction of the card. In addition, a frequency of a disturbing magnetic field generated by the one of the disturbing magnetic field generation part pairs is included in a band width of a data frequency determined by recording density of the magnetic data recorded in the magnetic stripe on the rear face of the card and a moving speed of the card in the card reader, and a frequency of a disturbing magnetic field generated by the other of the disturbing magnetic field generation part pairs is included in a band width of a data frequency determined by recording density of the magnetic data recorded in the magnetic stripe on the front face of the card and the moving speed of the card in the card reader.

In at least an embodiment of the present invention, it is preferable that the card reader includes a first magnetic head structured to perform at least one of reading of magnetic data recorded in the magnetic stripe formed on a rear face of the card and recording of magnetic data to the magnetic stripe, and a second magnetic head structured to perform at least one of reading of magnetic data recorded in the magnetic stripe formed on a front face of the card and recording of magnetic data to the magnetic stripe. When one side in a thickness direction of the card is referred to as a first direction side and the other side in the thickness direction of the card is referred to as a second direction side, the first magnetic head is disposed so as to face the card passage from the first direction side and the second magnetic head is disposed so as to face the card passage from the second direction side. The disturbing magnetic field generation means includes a first disturbing magnetic field generation part having the core and the coil and a second disturbing magnetic field generation part having the core and the coil. The core of the first disturbing magnetic field generation part is disposed so that the first imaginary line and the second imaginary line intersect each other on the first direction side with respect to the card passage in the thickness direction of the card, and the core of the second disturbing magnetic field generation part is disposed so that the first imaginary line and the second imaginary line intersect each other on the second direction side with respect to the card passage in the thickness direction of the card. In addition a frequency of a disturbing magnetic field generated by the first disturbing magnetic field generation part is included in a band width of a data frequency determined by recording density of the magnetic data recorded in the magnetic stripe on the rear face of the card and a moving speed of the card in the card reader, and a frequency of a disturbing magnetic field generated by the second disturbing magnetic field generation part is included in a band width of a data frequency determined by recording density of the magnetic data recorded in the magnetic stripe on the front face of the card and the moving speed of the card in the card reader.

According to this structure, even in a case that a skimming magnetic head for illegally acquiring magnetic data recorded in a magnetic stripe on a rear face of a card and a skimming magnetic head for illegally acquiring magnetic data recorded in a magnetic stripe on a front face of the card are arranged, influence of the disturbing magnetic fields is capable of being further effectively applied to both the skimming magnetic heads. Further, according to this structure, in read signals outputted from both the skimming magnetic heads, a read signal caused by magnetic data of a card is hard to be distinguished from a read signal caused by the disturbing magnetic field and thus skimming is capable of being prevented effectively.

In at least an embodiment of the present invention, it is preferable that the card reader includes a drive circuit configured to supply an electric current to the coil, the drive circuit includes a DC power supply with which the coil is connected, and a capacitor connected with the DC power supply in parallel with the coil, and a resonance circuit is structured of the coil and the capacitor. According to this structure, while electric power consumption is restrained, an AC magnetic field having a predetermined frequency is capable of being generated by the disturbing magnetic field generation means.

As described above, in the card reader in accordance with at least an embodiment of the present invention, influence of a disturbing magnetic field is capable of being further effectively applied to a skimming magnetic head.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the accompanying drawings.
(Structure of Card Reader)

Figure 1:
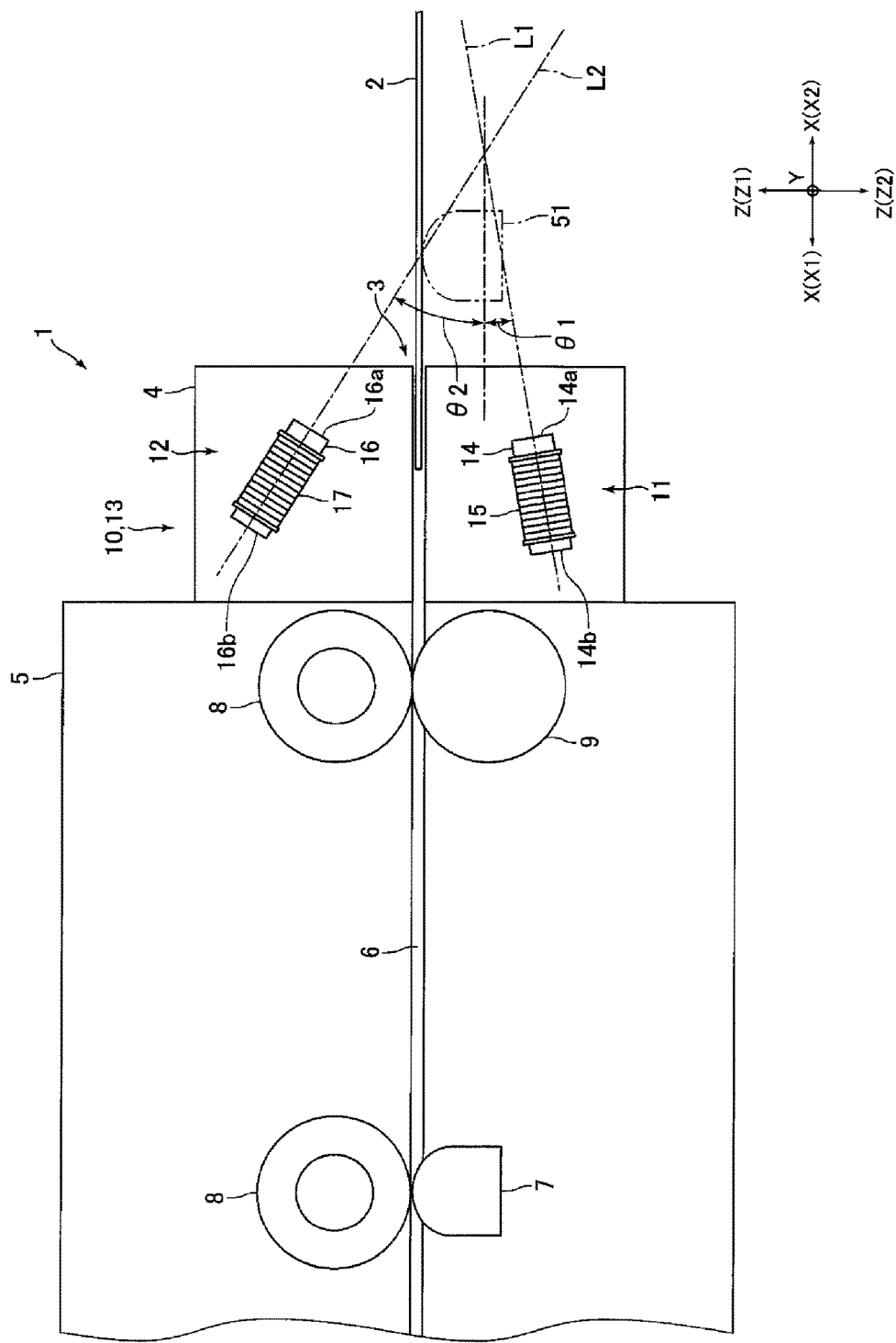
FIG. 1 is an explanatory schematic view showing a structure of a front end side portion of a card reader in accordance with an embodiment of the present invention.
Figure 2:
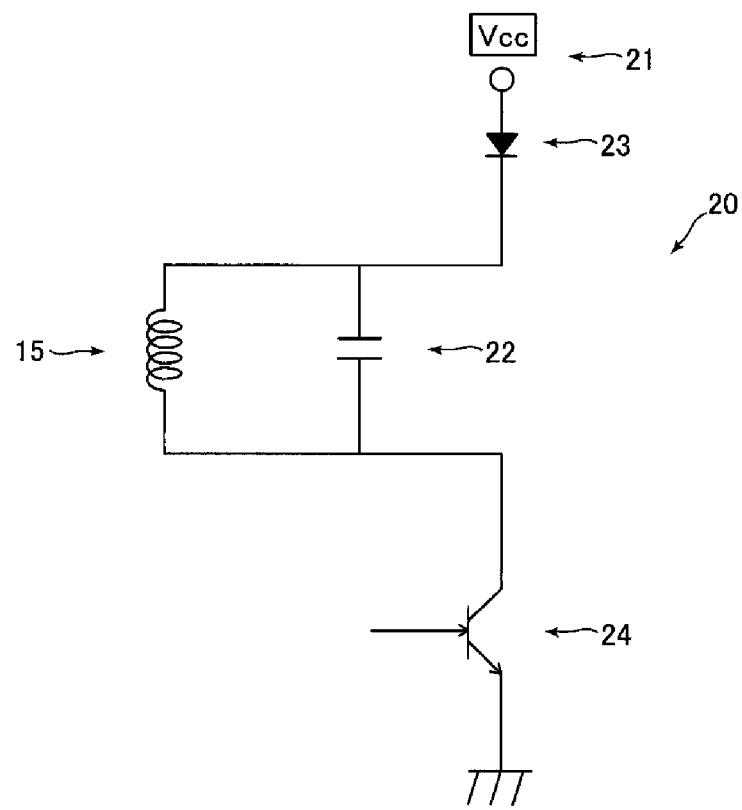
FIG. 2 is a schematic circuit diagram showing a drive circuit for supplying an electric current to a coil shown in FIG. 1.

FIG. 1 is an explanatory schematic view showing a structure of a front end side portion of a card reader 1 in accordance with an embodiment of the present invention. FIG. 2 is a schematic circuit diagram showing a drive circuit 20 for supplying an electric current to a coil 15 shown in FIG. 1.

A card reader 1 in this embodiment is a device structured to perform reading of magnetic data recorded on a card 2 and/or recording of magnetic data to a card 2. For example, the card reader 1 is mounted and used in a predetermined host apparatus such as an ATM. The card reader 1 includes a card insertion part 4 formed with a card insertion port 3 into which a card 2 is inserted and a main body part 5. An inside of the card reader 1 is formed with a card passage 6 where a card 2 inserted from the card insertion port 3 is passed. Further, the card reader 1 includes a magnetic head 7 configured to perform at least one of reading of magnetic data recorded on a card 2 and recording of magnetic data to the card 2, a drive roller 8 and a pad roller 9 for conveying the card 2, and a disturbing magnetic field generation means 10 structured to generate a disturbing magnetic field for disturbing fraudulent reading of magnetic data recorded on the card 2.

In this embodiment, a card 2 is passed in the "X" direction shown in FIG. 1. Specifically, a card 2 is inserted to the "X1" direction and the card 2 is ejected to the "X2" direction. In other words, the "X" direction is a passing direction of a card 2, the "X1" direction is an inserting direction of a card 2 to the card insertion port 3, which is one side in the passing direction of the card 2, and the "X2" direction is an ejecting direction of the card 2 from the card insertion port 3 which is the other side in the passing direction of the card 2. Further, the "Z" direction in FIG. 1 perpendicular to the "X" direction is a thickness direction of a card 2 having been taken into the card reader 1, and the "Y" direction in FIG. 1 perpendicular to the "X" direction and the "Z" direction is a width direction of the card 2 having been taken into the card reader 1. In the following descriptions, the "X" direction is a "front and rear direction", the "Y" direction is a "right and left direction" and the "Z" direction is an "upper and lower direction". Further, the "X1" direction side is a "rear (back)" side, the "X2" direction side is a "front" side, the "Z1" direction side is an "upper" side, and the "Z2" direction side is a "lower" side. In this embodiment, a lower side ("Z2" direction side) is a first direction side which is one side in a thickness direction of a card 2, and an upper side ("Z1" direction side) is a second direction side which is the other side in the thickness direction of the card 2.

A card 2 is, for example, a card made of vinyl chloride in a substantially rectangular shape whose thickness is about 0.7-0.8 mm. A magnetic stripe in which magnetic data are recorded is formed on a rear face of the card 2. The magnetic stripe is formed along a longitudinal direction of the card 2 which is formed in a substantially rectangular shape. A card 2 is inserted into the card reader 1 in a state that its rear face faces a lower side and that a longitudinal direction of the card 2 is substantially coincided with the front and rear direction and is conveyed in an inside of the card reader 1.

In accordance with an embodiment of the present invention, an IC chip or an antenna for communication may be incorporated into the card 2. Further, the card 2 may be a PET (polyethylene terephthalate) card whose thickness is about 0.18-0.36 mm or may be a paper card having a predetermined thickness.

The card insertion part 4 is attached to a front end face of the main body part 5. The magnetic head 7, the drive roller 8 and the pad roller 9 are disposed in an inside of the main body part 5. The magnetic head 7 is disposed so as to face the card passage (card conveying passage) 6 from a lower side. Specifically, the magnetic head 7 is disposed so that its gap part faces the card passage 6 from a lower side. Further, the magnetic head 7 is disposed at a position where a magnetic stripe of a card 2 is passed in the right and left direction. The drive roller 8 and the pad roller 9 are disposed so as to interpose the card passage 6 in the upper and lower direction. The drive roller 8 is connected with a motor through a power transmission mechanism such as a belt or a pulley. The pad roller 9 is urged toward the drive roller 8. A card 2 is conveyed in a state that the card 2 is sandwiched between the drive roller 8 and the pad roller 9.

A disturbing magnetic field generation means 10 is disposed in an inside of the card insertion part 4. The disturbing magnetic field generation means 10 is provided with a first disturbing magnetic field generation part pair 13 comprised of a first disturbing magnetic field generation part 11 and a second disturbing magnetic field generation part 12 which are disposed so as to interpose the card passage 6 in the upper and lower direction. The first disturbing magnetic field generation part 11 includes a core 14 as a first core formed of magnetic material and an exciting coil 15 wound around the core 14. The second disturbing magnetic field generation part 12 includes a core 16 as a second core formed of magnetic material and an exciting coil 17 wound around the core 16. The first disturbing magnetic field generation part 11 is disposed to a lower side of the card passage 6 and the second disturbing magnetic field generation part 12 is disposed to an upper side of the card passage 6.

The cores 14 and 16 are formed in a bar shape such as a substantially rectangular pillar shape or a substantially columnar shape. Further, the cores 14 and 16 are formed in substantially same shapes as each other. The cores 14 and 16 are disposed so that one end faces 14a and 16a are directed toward a substantially front side and the other end faces 14b and 16b are directed toward a substantially rear side. As described above, the first disturbing magnetic field generation part 11 is disposed to a lower side of the card passage 6, and the second disturbing magnetic field generation part 12 is disposed to an upper side of the card passage 6. Further, the core 14 is disposed to a lower side of the card passage 6 and the core 16 is disposed to an upper side of the card passage 6. In other words, one end face 14a is disposed on a lower side with respect to the card passage 6 in the upper and lower direction, and one end face 16a is disposed on an upper side with respect to the card passage 6 in the upper and lower direction.

The cores 14 and 16 are disposed at the same position as the magnetic head 7 in the right and left direction. In other words, the cores 14 and 16 are disposed at a position in the right and left direction where a magnetic stripe of a card 2 is passed, and one end faces 14a and 16a are disposed at a position in the right and left direction where a magnetic stripe of a card 2 is passed. Further, the cores 14 and 16 are disposed at substantially same positions as each other in the front and rear direction, and one end face 14a and one end face 16a are disposed at substantially same positions as each other in the front and rear direction. In addition, the cores 14 and 16 are disposed so that a distance between one end face 14a and the card passage 6 in the upper and lower direction and a distance between one end face 16a and the card passage 6 in the upper and lower direction are substantially equal to each other.

In a case that an imaginary line which passes through a center of one end face 14a of the core 14 and is perpendicular to the one end face 14a is referred to as a first imaginary line "L1" and an imaginary line which passes a center of one end face 16a of the core 16 and is perpendicular to the one end face 16a is referred to as a second imaginary line "L2", when viewed in the right and left direction, the cores 14 and 16 are disposed so that the first imaginary line "L1" and the second imaginary line "L2" are inclined with respect to the front and rear direction so as to approach to each other toward a front side and intersect each other on a front side with respect to the card insertion port 3 and at a position displaced from the position where the card 2 is passed in the upper and lower direction. In other words, when viewed in the right and left direction, the cores 14 and 16 formed in a bar shape are disposed so as to incline at different angles from each other with respect to the front and rear direction.

In this embodiment, when viewed in the right and left direction, an inclination angle "θ1" of the first imaginary line "L1" with respect to the front and rear direction is set to be smaller than an inclination angle "θ2" of the second imaginary line "L2" with respect to the front and rear direction, and the first imaginary line "L1" and the second imaginary line "L2" intersect each other to a lower side of the card passage 6. One end face 14a in this embodiment is a first end face which is one end face of the core 14, and one end face 16a is a second end face which is one end face of the core 16. In this embodiment, the first imaginary line "L1" is coincided with a center axis of the core 14 and passes through a center of the other end face 14b and is perpendicular to the other end face 14b. Similarly, the second imaginary line "L2" is coincided with a center axis of the core 16 and passes through a center of the other end face 16b and is perpendicular to the other end face 16b.

The coil 15 is wound around the core 14 through a bobbin. Specifically, the coil 15 is wound around an outer peripheral face of the core 14 so that a center axis of the core 14 is an axis of winding. The coil 15 is connected with a drive circuit 20 for supplying an electric current to the coil 15. The drive circuit 20 is, as shown in FIG. 2, provided with a DC (direct current) power supply 21 with which the coil 15 is connected and a capacitor 22 connected with the DC power supply 21 in parallel with the coil 15. The coil 15 and the capacitor 22 structure a resonance circuit. One ends of the coil 15 and the capacitor 22 are connected with the DC power supply 21 through a diode 23, and the other ends of the coil 15 and the capacitor 22 are grounded through a transistor 24.

In the drive circuit 20, when a drive current is supplied to a base of the transistor 24, electric power is supplied from the DC power supply 21 to the coil 15 and the capacitor 22 and an electric current is flown through the coil 15 and electric charge is stored in the capacitor 22. In this state, when supply of the electric current to the base of the transistor 24 is stopped, an electric current changed at a predetermined resonance frequency is flown through the coil 15, and a disturbing magnetic field (AC magnetic field) changing at the resonance frequency is generated from the first disturbing magnetic field generation part 11.

Similarly to the coil 15, the coil 17 is wound around the core 16 through a bobbin. Specifically, the coil 17 is wound around an outer peripheral face of the core 16 so that a center axis of the core 16 is an axis of winding. Further, the coil 17 is connected with a drive circuit structured similarly to the drive circuit 20 and an electric current changing at a predetermined resonance frequency is flown through the coil 17. When an electric current changing at a predetermined resonance frequency is flown through the coil 17, a disturbing magnetic field (AC magnetic field) changing at the resonance frequency is generated from the second disturbing magnetic field generation part 12.

Frequencies of the disturbing magnetic fields generated by the first disturbing magnetic field generation part 11 and the second disturbing magnetic field generation part 12 are included in a band width of data frequency determined by recording density of magnetic data recorded in a magnetic stripe of a card 2 and a moving speed of the card 2 in the card reader 1. In this embodiment, magnetic data whose recording density is 210 bpi (bit per inch) and magnetic data whose recording density is 75 bpi are recorded in a magnetic stripe on a rear face of a card 2 based on the international standard or JIS standard. Therefore, frequencies of the disturbing magnetic fields generated by the first disturbing magnetic field generation part 11 and the second disturbing magnetic field generation part 12 are included in a band width of data frequency determined by the recording density of 210 bpi and a moving speed of a card 2 in the card reader 1, or included in a band width of data frequency determined by the recording density of 75 bpi and the moving speed of the card 2 in the card reader 1.

Specifically, a frequency of the disturbing magnetic field generated from one of the first disturbing magnetic field generation part 11 and the second disturbing magnetic field generation part 12 is included in a band width of data frequency determined by the recording density of 210 bpi and a moving speed of a card 2 in the card reader 1. Further, a frequency of a disturbing magnetic field generated by the other of the first disturbing magnetic field generation part 11 and the second disturbing magnetic field generation part 12 is included in a band width of a data frequency determined by the recording density of 75 bpi and the moving speed of the card 2 in the card reader 1. In other words, the frequency of the disturbing magnetic field generated from the one end face 14a side and the frequency of the disturbing magnetic field generated from one end face 16a side are different from each other. In accordance with an embodiment of the present invention, both of a frequency of the disturbing magnetic field generated by the first disturbing magnetic field generation part 11 and a frequency of the disturbing magnetic field generated by the second disturbing magnetic field generation part 12 may be included in a band width of a data frequency determined by the recording density of 210 bpi and the moving speed of a card 2 in the card reader 1, or may be included in a band width of a data frequency determined by the recording density of 75 bpi and the moving speed of a card 2 in the card reader 1.

In the card reader 1 structured as described above, in a case that a card 2 is inserted from the card insertion port 3 and is taken into an inside of the card reader 1 and, in a case that the card 2 is ejected from the card insertion port 3, the disturbing magnetic field generation means 10 generates a disturbing magnetic field. In other words, the disturbing magnetic field generation means 10 does not generate a disturbing magnetic field at the time of reading and recording of magnetic data by the magnetic head 7. Further, when a card 2 is inserted from the card insertion port 3 and is taken into an inside of the card reader 1, for example, the disturbing magnetic field generation means 10 generates a disturbing magnetic field until the entire card 2 inserted from the card insertion port 3 is taken into an inside of the card insertion part 4. Further, when a card 2 is to be ejected from the card insertion port 3, for example, the disturbing magnetic field generation means 10 generates a disturbing magnetic field until a card 2 having been conveyed to a position where the card 2 is capable of being taken out by a user is pulled out by the user.

(Principal Effects in this Embodiment)

As described above, in this embodiment, the disturbing magnetic field generation means 10 includes the first disturbing magnetic field generation part 11 disposed to a lower side of the card passage 6 and the second disturbing magnetic field generation part 12 disposed to an upper side of the card passage 6. Further, the core 14 of the first disturbing magnetic field generation part 11 and the core 16 of the second disturbing magnetic field generation part 12 are disposed so that, when viewed in the right and left direction, the first imaginary line "L1" and the second imaginary line "L2" are inclined with respect to the front and rear direction so as to approach each other toward the front side and intersect each other to a front side of the card insertion port 3 and to a lower side of the card passage 6.

Therefore, in this embodiment, as shown in FIG. 1, influence of a disturbing magnetic field generated by the second disturbing magnetic field generation part 12 can be effectively applied to a magnetic gap of a skimming magnetic head 51 which is arranged to a front side of the card insertion port 3 so as to face a portion from a lower side where a card 2 is to be passed. Further, in this embodiment, influence of a disturbing magnetic field generated by the first disturbing magnetic field generation part 11 can be effectively applied to an opening part of a case body of the skimming magnetic head 51. In other words, influence of the disturbing magnetic field can be effectively applied to a core and a coil of the skimming magnetic head 51 which are not covered by magnetic material through the opening part of the case body. As described above, in this embodiment, influence of a disturbing magnetic field can be effectively applied to a magnetic gap of the skimming magnetic head 51, and influence of a disturbing magnetic field can be effectively applied to a core and a coil of the skimming magnetic head 51 which are not covered by magnetic material. Therefore, according to this embodiment, influence of a disturbing magnetic field can be further effectively applied to the skimming magnetic head 51 and, as a result, significant reading of magnetic data by the skimming magnetic head 51 can be prevented.

The skimming magnetic head 51 is arranged at a position where a magnetic stripe is passed in the right and left direction. In this embodiment, one end faces 14a and 16a of the cores 14 and 16 are disposed at positions in the right and left direction where a magnetic stripe of a card 2 is passed and thus influence of a disturbing magnetic field can be further effectively applied to the skimming magnetic head 51.

In this embodiment, frequencies of disturbing magnetic fields generated by the first disturbing magnetic field generation part 11 and the second disturbing magnetic field generation part 12 are included in a band width of a data frequency determined by recording density of magnetic data recorded in a magnetic stripe of a card 2 and a moving speed of the card 2 in the card reader 1. Therefore, according to this embodiment, in a read signal outputted from the skimming magnetic head 51, a read signal based on magnetic data of a card 2 is hard to be distinguished from a read signal caused by the disturbing magnetic field. Accordingly, in this embodiment, skimming can be prevented effectively.

Especially, in this embodiment, a frequency of a disturbing magnetic field generated by one of the first disturbing magnetic field generation part 11 and the second disturbing magnetic field generation part 12 is included in a band width of a data frequency determined by recording density of 210 bpi and a moving speed of a card 2 in the card reader 1, and a frequency of a disturbing magnetic field generated by the other of the first disturbing magnetic field generation part 11 and the second disturbing magnetic field generation part 12 is included in a band width of a data frequency determined by recording density of 75 bpi and the moving speed of the card 2 in the card reader 1. Therefore, according to this embodiment, in a read signal outputted from the skimming magnetic head 51, a read signal caused by the magnetic data of the card 2 is further difficult to be distinguished from a read signal caused by the disturbing magnetic field. Accordingly, in this embodiment, skimming can be prevented effectively.

In this embodiment, the drive circuit 20 is provided with a DC power supply 21 and a capacitor 22 connected with the DC power supply 21 in parallel with the coil 15, and a resonance circuit is structured of the coil 15 and the capacitor 22. Further, a drive circuit for supplying an electric current to the coil 17 is also provided with a DC power supply and a capacitor connected with the DC power supply in parallel with the coil 17, and a resonance circuit is structured of the coil 17 and the capacitor. Therefore, according to this embodiment, while electric power consumption is restrained, an AC magnetic field (disturbing magnetic field) having a predetermined frequency can be generated by the disturbing magnetic field generation means 10.

(First Modified Embodiment of Disturbing Magnetic Field Generation Device)

Figure 3:
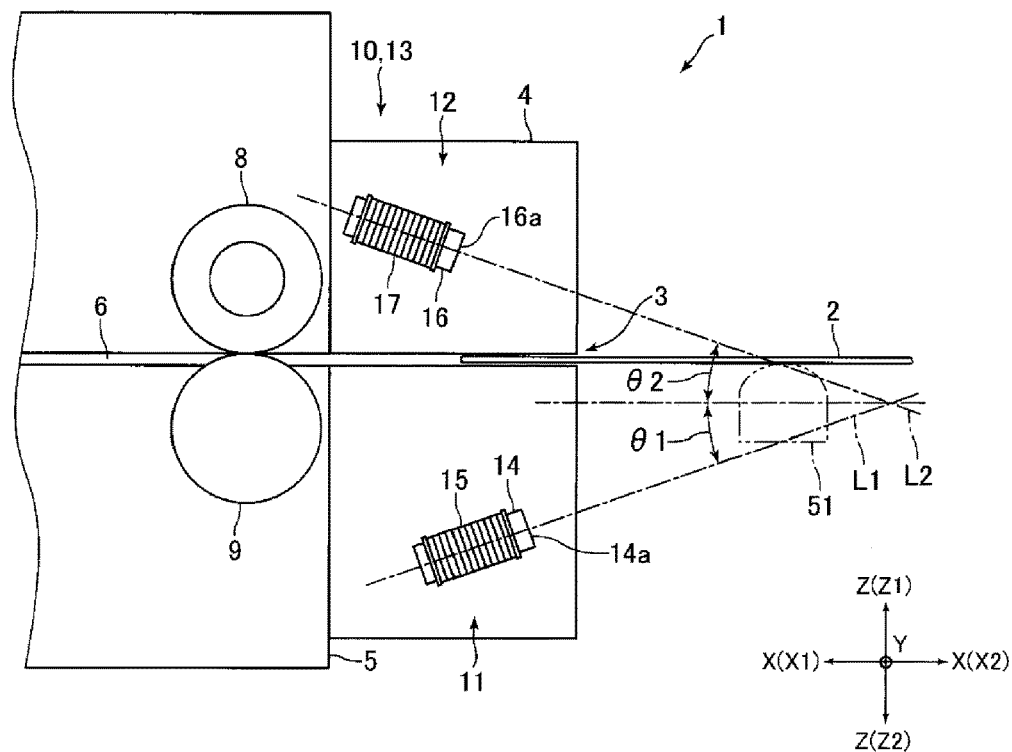
FIG. 3 is an explanatory schematic view showing a disturbing magnetic field generation means in accordance with another embodiment of the present invention.

FIG. 3 is an explanatory schematic view showing a disturbing magnetic field generation means 10 in accordance with another embodiment of the present invention. In the embodiment described above, the one end face 14a of the core 14 and the one end face 16a of the core 16 are disposed at substantially the same positions in the front and rear direction, and a distance in the upper and lower direction between the one end face 14a and the card passage 6 and a distance in the upper and lower direction between the one end face 16a and the card passage 6 are substantially equal to each other, and the inclination angle "θ1" of the first imaginary line "L1" with respect to the front and rear direction is set to be smaller than the inclination angle "θ2" of the second imaginary line "L2" with respect to the front and rear direction. As a result, when viewed in the right and left direction, the first imaginary line "L1" and the second imaginary line "L2" intersect each other to a front side of the card insertion port 3 and to a lower side of the card passage 6. However, the present invention is not limited to this embodiment. When viewed in the right and left direction, it is sufficient that the first imaginary line "L1" and the second imaginary line "L2" intersect each other to a front side of the card insertion port 3 and to a lower side of the card passage 6. For example, it may be structured that one end face 14a and one end face 16a are displaced from each other in the front and rear direction, or a distance in the upper and lower direction between one end face 14a and the card passage 6 and a distance in the upper and lower direction between one end face 16a and the card passage 6 are different from each other, or the inclination angle "θ1" and the inclination angle "θ2" are substantially equal to each other.

In other words, when at least one of structures is adopted that positions in the front and rear direction of one end face 14a and one end face 16a are different from each other, a distance in the upper and lower direction between the one end face 14a and the card passage 6 and a distance in the upper and lower direction between the one end face 16a and the card passage 6 are different from each other, and the inclination angle "θ1" and the inclination angle "θ2" are different from each other, when viewed in the right and left direction, it can be structured that the first imaginary line "L1" and the second imaginary line "L2" intersect each other to a front side of the card insertion port 3 and to a lower side of the card passage 6. For example, as shown in FIG. 3, it may be structured that the inclination angle "θ1" and the inclination angle "θ2" are substantially equal to each other and one end face 14a is disposed on a front side with respect to one end face 16a, and a distance in the upper and lower direction between the one end face 14a and the card passage 6 is set to be longer than a distance in the upper and lower direction between the one end face 16a and the card passage 6. Also in this structure, when viewed in the right and left direction, the first imaginary line "L1" and the second imaginary line "L2" intersect each other to a front side of the card insertion port 3 and to a lower side of the card passage 6.

Also in this case, similar effects to the embodiment described above can be obtained. When one end face 14a and one end face 16a are disposed at substantially same positions in the front and rear direction, and a distance in the upper and lower direction between the one end face 14a and the card passage 6 and a distance in the upper and lower direction between the one end face 16a and the card passage 6 are substantially equal to each other, the size of the card reader 1 can be reduced in the upper and lower direction and the front and rear direction.

(Second Modified Embodiment of Disturbing Magnetic Field Generation Device)

Figure 4:
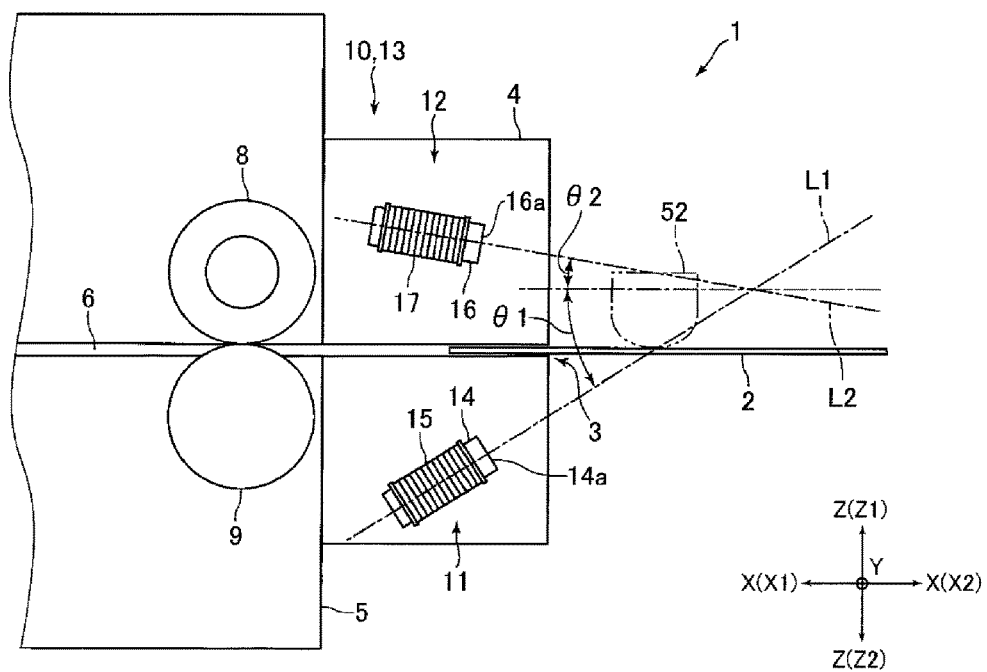
FIG. 4 is an explanatory schematic view showing a disturbing magnetic field generation means in accordance with another embodiment of the present invention.

FIG. 4 is an explanatory schematic view showing a disturbing magnetic field generation means 10 in accordance with another embodiment of the present invention. In the embodiment described above, a magnetic stripe is formed on a rear face of a card 2. However, the present invention is not limited to this embodiment. For example, a magnetic stripe may be formed on a front face of a card 2. In this case, as shown in FIG. 4, a skimming magnetic head 52 is arranged to a front side of the card insertion port 3 so as to face a portion where a card 2 is passed from an upper side. Therefore, in this case, the core 14 of the first disturbing magnetic field generation part 11 and the core 16 of the second disturbing magnetic field generation part 12 are disposed so that, when viewed in the right and left direction, the first imaginary line "L1" and the second imaginary line "L2" are inclined with respect to the front and rear direction so as to approach each other toward the front side and intersect each other to the front side of the card insertion port 3 and to an upper side of the card passage 6.

For example, the cores 14 and 16 are disposed so that the one end face 14a of the core 14 and the one end face 16a of the core 16 are disposed at substantially the same position in the front and rear direction, a distance in the upper and lower direction between the one end face 14a and the card passage 6 and a distance in the upper and lower direction between the one end face 16a and the card passage 6 are substantially equal to each other, and the inclination angle "θ1" is larger than the inclination angle "θ2". In this case, the magnetic head 7 is disposed so as to face the card passage 6 from an upper side. Further, in this case, magnetic data whose recording density is 210 bpi are recorded in a magnetic stripe on a front face of a card 2 based on JIS standard, and frequencies of disturbing magnetic fields generated by the first disturbing magnetic field generation part 11 and the second disturbing magnetic field generation part 12 are included in a band width of a data frequency determined by the recording density of 210 bpi and a moving speed of a card 2 in the card reader 1. Also in this case, similar effects to the embodiments described above can be obtained.

A magnetic stripe may be formed on both faces of a rear face and a front face of a card 2. In this case, the disturbing magnetic field generation means 10 may be provided with two disturbing magnetic field generation part pairs 13. In other words, a first disturbing magnetic field generation part pair 13 having the cores 14 and 16 which are disposed so that, when viewed in the right and left direction, the first imaginary line "L1" and the second imaginary line "L2" intersect each other to a lower side of the card passage 6, and a second disturbing magnetic field generation part pair 13 having the cores 14 and 16 which are disposed so that, when viewed in the right and left direction, the first imaginary line "L1" and the second imaginary line "L2" intersect each other to an upper side of the card passage 6.

In this case, a frequency of a disturbing magnetic field generated by the first disturbing magnetic field generation part pair 13 having the cores 14 and 16 disposed so that the first imaginary line "L1" and the second imaginary line "L2" intersect each other to a lower side of the card passage 6 is included in a band width of a data frequency determined by recording density of magnetic data recorded in a magnetic stripe on the rear face of a card 2 and a moving speed of the card 2 in the card reader 1. Further, a frequency of a disturbing magnetic field generated by the second disturbing magnetic field generation part pair 13 having the cores 14 and 16 disposed so that the first imaginary line "L1" and the second imaginary line "L2" intersect each other to an upper side of the card passage 6 is included in a band width of a data frequency determined by recording density of magnetic data recorded in a magnetic stripe on the front face of the card 2 and the moving speed of the card 2 in the card reader 1. Specifically, a magnetic stripe on a rear face of a card 2 is recorded with magnetic data whose recording density is 210 bpi and magnetic data whose recording density is 75 bpi based on the international standard or JIS standard, and a magnetic stripe on a front face of the card 2 is recorded with magnetic data whose recording density is 210 bpi based on JIS standard. Therefore, a frequency of a disturbing magnetic field generated by the first disturbing magnetic field generation part pair 13 is included in a band width of a data frequency determined by recording density of 75 bpi and a moving speed of a card 2 in the card reader 1, and a frequency of a disturbing magnetic field generated by the second disturbing magnetic field generation part pair 13 is included in a band width of a data frequency determined by recording density of 210 bpi and the moving speed of the card 2 in the card reader 1.

In this case, even when a skimming magnetic head 51 (see FIG. 1) for illegally acquiring magnetic data recorded in a magnetic stripe on a rear face of a card 2 and a skimming magnetic head 52 (see FIG. 4) for illegally acquiring magnetic data recorded in a magnetic stripe on a front face of the card 2 are arranged, influence of disturbing magnetic fields can be applied to both the skimming magnetic heads 51 and 52 further effectively. Further, in this case, in read signals outputted from the both skimming magnetic heads 51 and 52, the read signal caused by magnetic data of a card 2 is hard to be distinguished from a read signal caused by the disturbing magnetic field and thus skimming can be prevented effectively. In this case, the card reader 1 includes a magnetic head 7 disposed so as to face the card passage 6 from a lower side and a magnetic head 7 disposed so as to face the card passage 6 from an upper side. The magnetic head 7 disposed so as to face the card passage 6 from a lower side is a first magnetic head, and the magnetic head 7 disposed so as to face the card passage 6 from an upper side is a second magnetic head.

(Third Modified Embodiment of Disturbing Magnetic Field Generation Device)

Figure 5:
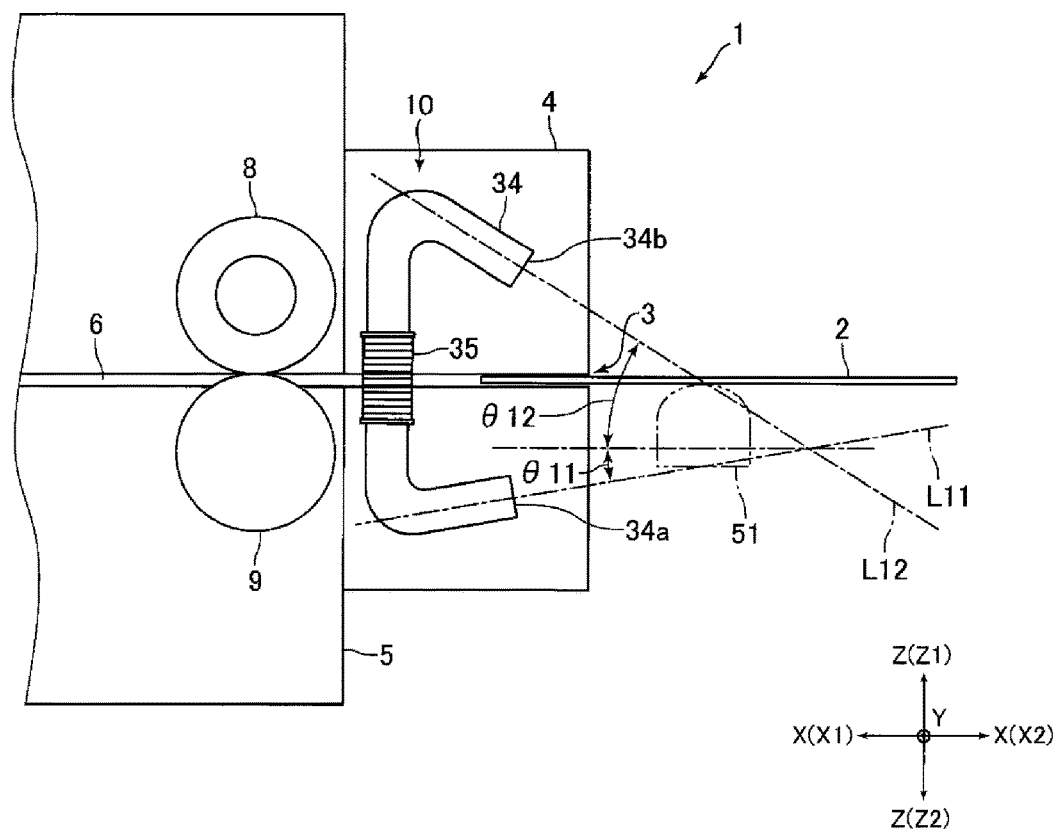
FIG. 5 is an explanatory schematic view showing a disturbing magnetic field generation means in accordance with another embodiment of the present invention.
Figure 6:
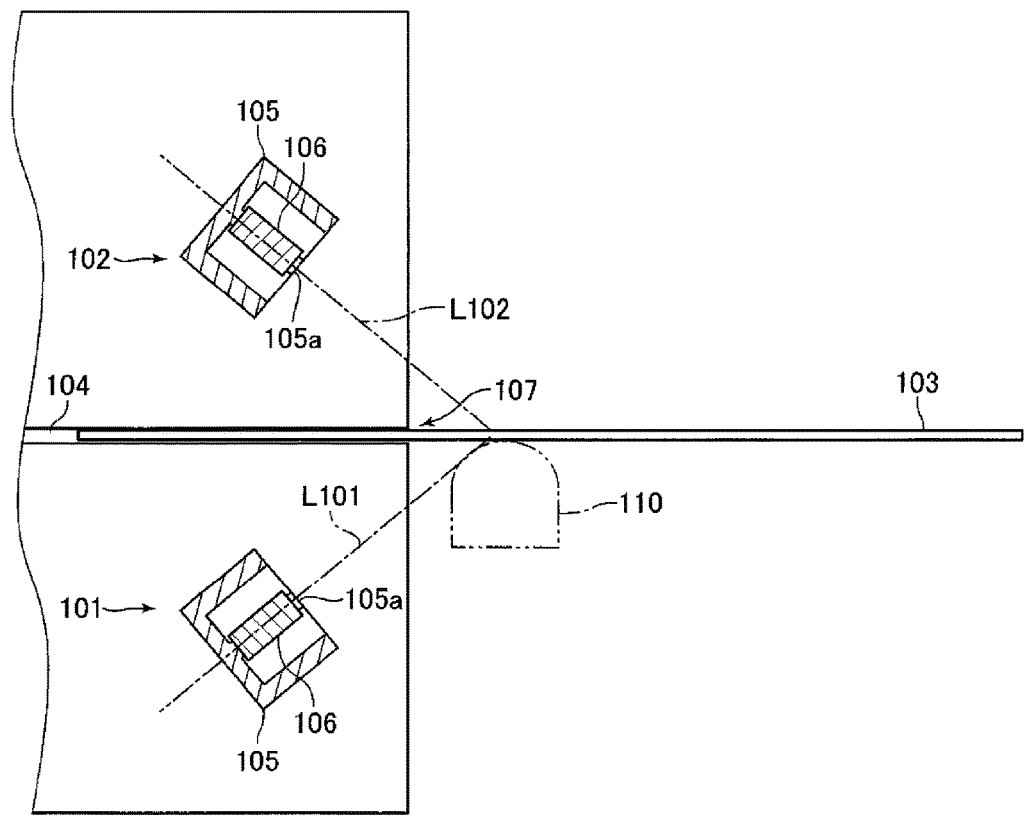
FIG. 6 is an explanatory schematic view showing a disturbing magnetic field generation means in a conventional technique.
Figure 7:
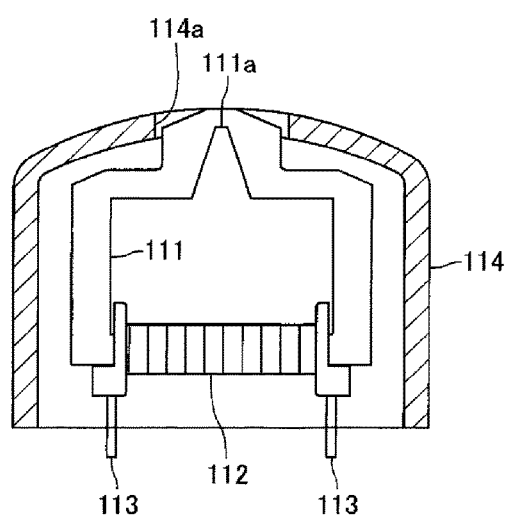
FIG. 7 is a cross-sectional view showing an internal structure of an ordinary magnetic head.

FIG. 5 is an explanatory schematic view showing a disturbing magnetic field generation means 10 in accordance with another embodiment of the present invention. In the embodiments described above, the disturbing magnetic field generation means 10 is structured of the disturbing magnetic field generation part pair 13 comprised of the first disturbing magnetic field generation part 11 having the core 14 and the second disturbing magnetic field generation part 12 having the core 16 which is separately formed from the core 14. However, the present invention is not limited to this embodiment. For example, the disturbing magnetic field generation means 10 may be, as shown in FIG. 5, structured of one core 34 formed of magnetic material and an exciting coil 35 which is wound around the core 34.

The core 34 is formed in a bar shape having a substantially "C"-shape or a substantially "U"-shape when viewed in the right and left direction. The core 34 is disposed so that one end face 34*a* of the core 34 and the other end face 34*b* of the core 34 are directed toward a substantially front side. The one end face 34*a* is disposed on a lower side with respect to the card passage 6 in the upper and lower direction, and the other end face 34*b* is disposed on an upper side with respect to the card passage 6 in the upper and lower direction. In other words, the one end face 34*a* and the other end face 34*b* are disposed so as to interpose the card passage 6 therebetween in the upper and lower direction. Further, in the right and left direction, the core 34 is disposed at a position where a magnetic stripe of a card 2 is passed and, in the right and left direction, the one end face 34*a* and the other end face 34*b* are disposed at a position where the magnetic stripe of the card 2 is passed.

In a case that an imaginary line passing through the center of the one end face 34*a* and perpendicular to the one end face 34*a* is referred to as a first imaginary line "L11" and an imaginary line passing through the center of the other end face 34*b* and perpendicular to the other end face 34*b* is referred to as a second imaginary line "L12", when viewed in the right and left direction, the core 34 is formed so that the first imaginary line "L11" and the second imaginary line "L12" are inclined with respect to the front and rear direction so as to approach each other toward a front side and intersect each other to the front side of the card insertion port 3 and, in the upper and lower direction, at a position displaced from the position where a card 2 is passed. Specifically, in a case that a magnetic stripe is formed on a rear face of a card 2, as shown in FIG. 5, the core 34 is formed so that the first imaginary line "L11" and the second imaginary line "L12" intersect each other on a lower side with respect to the card passage 6 when viewed in the right and left direction. Further, in a case that a magnetic stripe is formed on a front face of a card 2, the core 34 is formed so that the first imaginary line "L11" and the second imaginary line "L12" intersect each other on an upper side with respect to the card passage 6 when viewed in the right and left direction.

For example, in a case that a magnetic stripe is formed on a rear face of a card 2, one end face 34*a* and the other end face 34*b* are disposed at substantially same positions in the front and rear direction, a distance in the upper and lower direction between the one end face 34a and the card passage 6 and a distance in the upper and lower direction between the other end face 34b and the card passage 6 are substantially equal to each other, and an inclination angle "θ11" of the first imaginary line "L11" with respect to the front and rear direction is set to be smaller than an inclination angle "θ12" of the second imaginary line "L12" with respect to the front and rear direction. As a result, the first imaginary line "L11" and the second imaginary line "L12" intersect each other on a lower side with respect to the card passage 6. Further, for example, in a case that a magnetic stripe is formed on a front face of a card 2, one end face 34a and the other end face 34b are disposed at substantially same positions in the front and rear direction, a distance in the upper and lower direction between the one end face 34a and the card passage 6 and a distance in the upper and lower direction between the other end face 34b and the card passage 6 are substantially equal to each other, and the inclination angle "θ11" is set to be larger than the inclination angle "θ12". As a result, the first imaginary line "L11" and the second imaginary line "L12" intersect each other on an upper side with respect to the card passage 6. In this modified embodiment, the one end face 34a is a first end face which is one end face of the core 34 and the other end face 34b is a second end face which is the other end face of the core 34.

The coil 35 is wound around the core 34 through a bobbin. Specifically, the coil 35 is wound around an outer peripheral face of the core 34 so that a center axis of the core 34 is an axis of winding. The coil 35 is connected with a drive circuit which is similarly structured to the drive circuit 20.

Also in this modified embodiment, influence of a disturbing magnetic field generated from the other end face 34b side can be effectively applied to a magnetic gap of a skimming magnetic head 51 which is arranged to a front side of the card insertion port 3 and so as to face a portion from a lower side where a card 2 is to be passed and, in addition, influence of a disturbing magnetic field generated from the one end face 34a side can be effectively applied to an opening part of a case body of the skimming magnetic head 51. Alternatively, influence of a disturbing magnetic field generated from the one end face 34a side can be effectively applied to a magnetic gap of a skimming magnetic head 52 (see FIG. 4) which is arranged to a front side of the card insertion port 3 and so as to face a portion from an upper side where a card 2 is to be passed and, in addition, influence of a disturbing magnetic field generated from the other end face 34b side can be effectively applied to an opening part of a case body of the skimming magnetic head 52. Therefore, also in this modified embodiment, similar effects to the embodiments described above can be obtained.

In a case that a magnetic stripe is formed on both faces of a rear face and a front face of a card 2, the disturbing magnetic field generation means 10 includes a first disturbing magnetic field generation part having a core 34, which is disposed so that, when viewed in the right and left direction, the first imaginary line "L11" and the second imaginary line "L12" intersect each other on a lower side with respect to the card passage 6, and a coil 35 wound around the core 34, and a second disturbing magnetic field generation part having a core 34, which is disposed so that, when viewed in the right and left direction, the first imaginary line "L11" and the second imaginary line "L12" intersect each other on an upper side with respect to the card passage 6, and a coil 35 wound around the core 34. In accordance with an embodiment of the present invention, in a case that a magnetic stripe is formed on both faces of a rear face and a front face of a card 2, the disturbing magnetic field generation means 10 may include, for example, the disturbing magnetic field generation part pair 13 having the cores 14 and 16, which are disposed so that, when viewed in the right and left direction, the first imaginary line "L1" and the second imaginary line "L2" intersect each other on a lower side with respect to the card passage 6, and a second disturbing magnetic field generation part having the core 34, which is disposed so that, when viewed in the right and left direction, the first imaginary line "L11" and the second imaginary line "L12" intersect each other on an upper side with respect to the card passage 6, and the coil 35 wound around the core 34.

(Other Embodiments)

Although the present invention has been shown and described with reference to specific embodiments, various changes and modifications will be apparent to those skilled in the art from the teachings herein.

In the embodiments describe above, the one end face 14a of the core 14 and the one end face 16a of the core 16 are disposed at positions in the right and left direction where a magnetic stripe of a card 2 is passed. However, the present invention is not limited to this embodiment. For example, when influence of disturbing magnetic fields generated from the one end faces 14a and 16a is capable of being effectively applied to the skimming magnetic head 51, the one end faces 14a and 16a may be displaced from a position in the right and left direction where a magnetic stripe of a card 2 is passed.

In the embodiments described above, the card reader 1 is a card conveyance type card reader provided with a drive roller 8 and a pad roller 9. However, a card reader to which the structure of at least an embodiment of the present invention is applied may be a manual type card reader in which reading and recording of magnetic data are performed while a user moves a card 2 manually. For example, a card reader to which the structure of at least an embodiment of the present invention is applied may be a so-called dip-type card reader which is structured to perform reading and recording of magnetic data when a card 2 is inserted into the card reader or, when a card 2 is drawn out from the card reader.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card having a magnetic stripe, the card reader comprising:
   a card insertion port into which the card is inserted;
   a card passage where the card is passed; and
   a disturbing magnetic field generator generating a disturbing magnetic field to disturb fraudulent reading of magnetic data recorded in the magnetic stripe;
   wherein the disturbing magnetic field generator comprises at least one disturbing magnetic field generation part pair comprised of a first disturbing magnetic field generation part and a second disturbing magnetic field generation part which are disposed so as to interpose the card passage in a thickness direction of the card;

wherein the first disturbing magnetic field generation part comprises a first core formed of magnetic material and a coil wound around the first core, and the second disturbing magnetic field generation part comprises a second core formed of magnetic material and a coil wound around the second core; and wherein when an inserting direction side of the card to the card insertion port which is one side in a passing direction of the card is referred to as a rear side, an ejecting direction side of the card from the card insertion port which is the other side in the passing direction of the card is referred to as a front side, an imaginary line passing through a center of a first end face which is one of end faces of the first core and perpendicular to the first end face is referred to as a first imaginary line, and an imaginary line passing through a center of a second end face which is one of end faces of the second core and perpendicular to the second end face is referred to as a second imaginary line, the first core and the second core are disposed so that, when viewed in a width direction of the card perpendicular to the passing direction of the card and a thickness direction of the card, the first imaginary line and the second imaginary line are inclined with respect to the passing direction of the card so as to approach each other toward the front side and intersect each other on the front side with respect to the card insertion port and intersect each other at a position displaced from a passing position of the card in the thickness direction of the card.

2. The card reader according to claim 1, wherein the first end face and the second end face are disposed at positions in the width direction of the card where the magnetic stripe is passed.

3. The card reader according to claim 1, further comprising a magnetic head performing at least one of reading of magnetic data recorded in the magnetic stripe and recording of magnetic data to the magnetic stripe, wherein one side in the thickness direction of the card is referred to as a first direction side and the other side in the thickness direction of the card is referred to as a second direction side, the magnetic head is disposed so as to face the card passage from the first direction side, wherein the first end face is disposed on the first direction side with respect to the card passage in the thickness direction of the card, and the second end face is disposed on the second direction side with respect to the card passage in the thickness direction of the card, wherein the first end face and the second end face are disposed at substantially same positions in the passing direction of the card, wherein a distance in the thickness direction of the card between the first end face and the card passage and a distance in the thickness direction of the card between the second end face and the card passage are substantially equal to each other, and wherein when viewed in the width direction of the card, an inclination angle of the first imaginary line with respect to the passing direction of the card is set to be smaller than an inclination angle of the second imaginary line with respect to the passing direction of the card.

4. The card reader according to claim 1, wherein a frequency of a disturbing magnetic field generated by the disturbing magnetic field generator is included in a band width of a data frequency determined by recording density of magnetic data recorded in the magnetic stripe and a moving speed of the card in the card reader.

5. The card reader according to claim 4, wherein a frequency of a disturbing magnetic field generated from the first end face side and a frequency of a disturbing magnetic field generated from the second end face side are different from each other.

6. The card reader according to claim 1, further comprising:

a first magnetic head performing at least one of reading of magnetic data recorded in the magnetic stripe formed on a rear face of the card and recording of magnetic data to the magnetic stripe; and a second magnetic head performing at least one of reading of magnetic data recorded in the magnetic stripe formed on a front face of the card and recording of magnetic data to the magnetic stripe, wherein when one side in a thickness direction of the card is referred to as a first direction side and the other side in the thickness direction of the card is referred to as a second direction side, the first magnetic head is disposed so as to face the card passage from the first direction side and the second magnetic head is disposed so as to face the card passage from the second direction side, wherein the disturbing magnetic field generator comprises two disturbing magnetic field generation part pairs, wherein the first core and the second core of one of the disturbing magnetic field generation part pairs are disposed so that the first imaginary line and the second imaginary line intersect each other on the first direction side with respect to the card passage in the thickness direction of the card, wherein the first core and the second core of the other of the disturbing magnetic field generation part pairs are disposed so that the first imaginary line and the second imaginary line intersect each other on the second direction side with respect to the card passage in the thickness direction of the card, wherein a frequency of a disturbing magnetic field generated by the one of the disturbing magnetic field generation part pairs is included in a band width of a data frequency determined by recording density of the magnetic data recorded in the magnetic stripe on the rear face of the card and a moving speed of the card in the card reader, and wherein a frequency of a disturbing magnetic field generated by the other of the disturbing magnetic field generation part pairs is included in a band width of a data frequency determined by recording density of the magnetic data recorded in the magnetic stripe on the front face of the card and the moving speed of the card in the card reader.

7. The card reader according to claim 1, further comprising a drive circuit supplying an electric current to the coil, wherein the drive circuit comprises a DC power supply with which the coil is connected, and a capacitor connected with the DC power supply in parallel with the coil, and wherein a resonance circuit is structured of the coil and the capacitor.

8. A card reader comprising:

a card insertion port into which a card having a magnetic stripe is inserted;

a card passage where the card inserted from the card insertion port is passed; and a disturbing magnetic field generator generating a disturbing magnetic field to disturb fraudulent reading of magnetic data recorded in the magnetic stripe;

wherein the disturbing magnetic field generator comprises a core formed of magnetic material and a coil wound around the core;

wherein when an inserting direction side of the card to the card insertion port which is one side in a passing direction of the card is referred to as a rear side, an ejecting direction side of the card from the card insertion port which is the other side in the passing direction of the card is referred to as a front side, an imaginary line passing through a center of a first end face which is one of end faces of the core and perpendicular to the first end face is referred to as a first imaginary line, and an imaginary line passing through a center of a second end face which is the other of the end faces of core and perpendicular to the second end face is referred to as a second imaginary line, the core is formed so that the first end face and the second end face are directed to a substantially front side in the passing direction of the card and that the first end face and the second end face are disposed so as to interpose the card passage in a thickness direction of the card; and wherein when viewed in a width direction of the card perpendicular to the passing direction of the card and the thickness direction of the card, the first imaginary line and the second imaginary line are inclined with respect to the passing direction of the card so as to approach each other toward the front side and intersect each other on the front side with respect to the card insertion port and intersect each other at a position displaced from a passing position of the card in the thickness direction of the card.

9. The card reader according to claim 8, further comprising:

a first magnetic head performing at least one of reading of magnetic data recorded in the magnetic stripe formed on a rear face of the card and recording of magnetic data to the magnetic stripe; and a second magnetic head performing at least one of reading of magnetic data recorded in the magnetic stripe formed on a front face of the card and recording of magnetic data to the magnetic stripe, wherein when one side in a thickness direction of the card is referred to as a first direction side and the other side in the thickness direction of the card is referred to as a second direction side, the first magnetic head is disposed so as to face the card passage from the first direction side and the second magnetic head is disposed so as to face the card passage from the second direction side, wherein the disturbing magnetic field generator comprises a first disturbing magnetic field generation part having the core and the coil and a second disturbing magnetic field generation part having the core and the coil, wherein the core of the first disturbing magnetic field generation part is disposed so that the first imaginary line and the second imaginary line intersect each other on the first direction side with respect to the card passage in the thickness direction of the card, wherein the core of the second disturbing magnetic field generation part is disposed so that the first imaginary line and the second imaginary line intersect each other on the second direction side with respect to the card passage in the thickness direction of the card, wherein a frequency of a disturbing magnetic field generated by the first disturbing magnetic field generation part is included in a band width of a data frequency determined by recording density of the magnetic data recorded in the magnetic stripe on the rear face of the card and a moving speed of the card in the card reader, and wherein a frequency of a disturbing magnetic field generated by the second disturbing magnetic field generation part is included in a band width of a data frequency determined by recording density of the magnetic data recorded in the magnetic stripe on the front face of the card and the moving speed of the card in the card reader.

10. The card reader according to claim 8, wherein the first end face and the second end face are disposed at positions in the width direction of the card where the magnetic stripe is passed.

11. The card reader according to claim 8, further comprising a magnetic head performing at least one of reading of magnetic data recorded in the magnetic stripe and recording of magnetic data to the magnetic stripe, wherein one side in the thickness direction of the card is referred to as a first direction side and the other side in the thickness direction of the card is referred to as a second direction side, the magnetic head is disposed so as to face the card passage from the first direction side, wherein the first end face is disposed on the first direction side with respect to the card passage in the thickness direction of the card, and the second end face is disposed on the second direction side with respect to the card passage in the thickness direction of the card, wherein the first end face and the second end face are disposed at substantially same positions in the passing direction of the card, wherein a distance in the thickness direction of the card between the first end face and the card passage and a distance in the thickness direction of the card between the second end face and the card passage are substantially equal to each other, and wherein when viewed in the width direction of the card, an inclination angle of the first imaginary line with respect to the passing direction of the card is set to be smaller than an inclination angle of the second imaginary line with respect to the passing direction of the card.

12. The card reader according to claim 8, wherein a frequency of a disturbing magnetic field generated by the disturbing magnetic field generator is included in a band width of a data frequency determined by recording density of magnetic data recorded in the magnetic stripe and a moving speed of the card in the card reader.

13. The card reader according to claim 12, wherein a frequency of a disturbing magnetic field generated from the first end face side and a frequency of a disturbing magnetic field generated from the second end face side are different from each other.

14. The card reader according to claim 8, further comprising a drive circuit supplying an electric current to the coil, wherein the drive circuit comprises a DC power supply with which the coil is connected, and a capacitor connected with the DC power supply in parallel with the coil, and wherein a resonance circuit is structured of the coil and the capacitor.

* * * * *